United States Patent
Badilla-Bradford

(10) Patent No.: US 9,847,041 B2
(45) Date of Patent: *Dec. 19, 2017

(54) METHOD AND APPARATUS FOR LEARNING TO PLAY A STRINGED INSTRUMENT

(71) Applicant: Dylan J. Badilla-Bradford, New Orleans, LA (US)

(72) Inventor: Dylan J. Badilla-Bradford, New Orleans, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/428,886

(22) Filed: Feb. 9, 2017

(65) Prior Publication Data

US 2017/0200387 A1    Jul. 13, 2017

Related U.S. Application Data

(63) Continuation-in-part of application No. 14/993,255, filed on Jan. 12, 2016, now Pat. No. 9,613,541.

(51) Int. Cl.
 G09B 15/00 (2006.01)
 G09B 15/02 (2006.01)
 G10D 3/06 (2006.01)

(52) U.S. Cl.
 CPC ......... G09B 15/004 (2013.01); G09B 15/026 (2013.01); G10D 3/06 (2013.01)

(58) Field of Classification Search
 CPC ... G10D 3/06; G10D 1/08; G10D 1/00; G09B 15/003; G10H 1/0016; G10H 2220/051; G10H 2220/301
 See application file for complete search history.

(56) References Cited

U.S. PATENT DOCUMENTS

| | | |
|---|---|---|
| 3,153,970 A | 10/1964 | Mulchi |
| 5,373,768 A | 12/1994 | Sciortino |
| 5,920,023 A | 7/1999 | Ravagni et al. |
| 6,218,603 B1 | 4/2001 | Coonce |
| 7,408,105 B2 | 8/2008 | Murdock |
| 8,399,756 B1 | 3/2013 | Trent et al. |
| 8,704,066 B2 | 4/2014 | Jacobsen |
| 8,841,531 B2 | 9/2014 | Squillante |
| 9,613,541 B1 * | 4/2017 | Badilla-Bradford . G09B 15/004 |

* cited by examiner

*Primary Examiner* — Kimberly Lockett
(74) *Attorney, Agent, or Firm* — Keaty Law Firm, LLC

(57) ABSTRACT

A method and apparatus for learning to play a musical instrument, such as a guitar, by incorporating a markable, erasable surface onto the neck of the instrument such that the student may apply, as needed, removable markings to the instrument that indicate the correct finger positions for playing the instrument. The incorporation of this markable, erasable surface onto the instrument is an improved method of learning because a student is better able to place his or her fingers in the correct positions on the instrument when learning how to play the instrument.

20 Claims, 8 Drawing Sheets

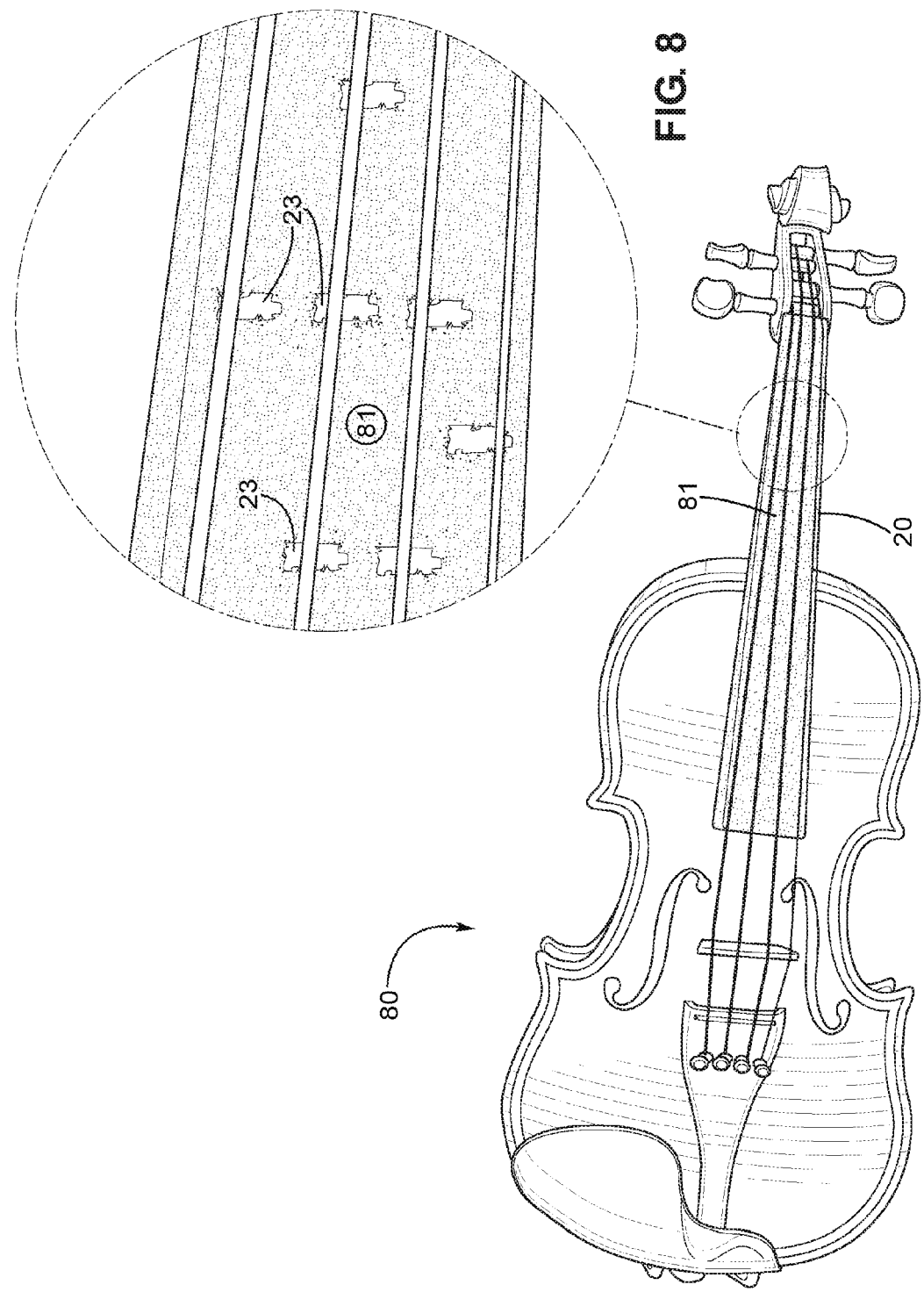

METHOD AND APPARATUS FOR LEARNING TO PLAY A STRINGED INSTRUMENT

CROSS-REFERENCE TO RELATED APPLICATIONS

This invention is a continuation-in-part of my copending application, "Method and Apparatus for Learning to Play a Stringed Instrument," Ser. No. 14/993,255, filed Jan. 12, 2016, the full disclosure of which is incorporated by reference and priority of which is hereby claimed.

BACKGROUND OF THE INVENTION

This invention provides a method and apparatus for learning to play a musical instrument, such as a guitar, by incorporating a markable, erasable surface onto the instrument that may guide a student to the correct finger positions. The incorporation of this markable, erasable surface onto the instrument is an improved method of learning because a student is better able to place his or her fingers in the correct positions on the instrument when learning how to play the instrument.

Guitars, and more generally stringed instruments, are normally comprised of sound holes, a sound box, a fretboard or fingerboard, a neck, a nut, a head, turning pegs, a bridge, and strings. The strings vibrate at one of its possible frequencies or pitches when a note is played on such a stringed, fretted instrument. The player of the instrument will press down in a particular manner on the strings to cause such a vibration, and thus the placement of the player's fingers on the strings corresponds to a particular pitch and note being played on the instrument. The player may play a variety of notes by pressing the string between different frets of the instrument before plucking the instrument and producing music.

When learning to play a fretted instrument, the student may employ a variety of learning devices to learn the correct placement of fingers on the strings of the instrument. Mnemonic devices are often used to teach students the names of sequences of notes and to memorize which notes are needed to form various "chords," which are combinations of various singular notes played at the same time. Visual cues such as fretboard or fingerboard diagrams are often used to teach students where to place their fingers in order to produce various notes.

Although there are a number of books, videos, and online resources devoted to providing students with visual cues needed to learn the fundamental skills required to learn a stringed instrument, most of these learning aids share a common deficiency: the fretboard or fingerboard patterns, note locations, or chords to be learned are printed on something other than the fretboard or fingerboard of the instrument itself. This forces students to expend a great deal of mental effort in order to figure out the relation between the fretboard or fingerboard patterns, note locations, or chords printed on the visual cue to the correct pattern on the actual instrument being played. The present invention seeks to eliminate this shortcoming by offering students the ability to print the visual cues directly to the surface of the fretboard or fingerboard of the instrument.

A variety of devices, besides the present invention, have been employed to attempt to affix visual cues directly to the surface of the fretboard. However, all of the devices existing in the prior art have significant shortcomings, making them ineffective or otherwise unattractive to use.

Some devices have a one-piece sheet of pliable material, such as linen, that extends along the length of the guitar, featuring fret openings cut into the material that can be secured to the side of the guitar using pins or the equivalent. For example, U.S. Pat. No. 7,408,105, issued Aug. 5, 2008 to Grayson M. Murdock for "Instrument Training Device for Stringed Instruments," discloses an instrument training device for use with a stringed instrument that includes a plurality of training members. Each training member is constructed of a flexible material such as hook and loop fasteners for securing a respective training member about a fret board of a stringed instrument by releasably fastening the opposed ends together. Each training member includes indicia on a front portion thereof corresponding to chord sets or tuning schemes. The front portion is constructed of a resilient or elastic material that may be stretched across the front surface of the fret board such that the indicia thereon is situated directly beneath predetermined strings. This enables each training member to be used on stringed instruments of different sizes or widths. Each training member includes an identifier for positioning the training member at a predetermined position along a fret board.

This type of visual cue device, although it offers a means to display the correct chord positions on top of the fretboard, is cumbersome to apply. More significantly, because the training member is a one-piece sheet of material, the openings cut throughout the material must be relatively large to accommodate the openings of the frets, which are spaced and sized differently on different types of guitars. It is therefore not adaptable to all types of fretboards or fingerboards, and, practically speaking, limits the size of the printing space available for chord depiction. Further, because the invention is comprised of one continuous piece of material, the student must either cover the entire fretboard at once, and thus employ use of all visual cues simultaneously, or else forego using the learning device entirely. This may be problematic because in some instances it may be a more beneficial learning tool for the student to concentrate on only certain chord markings. For example, once a student masters the location of one chord, it may be best to deprive himself of this visual cue moving forward in learning the next series of chords and finger positions.

Other devices offer a sheet of adhesive material, such as cling vinyl, on which is printed a series of markers indicating the appropriate chord positions. For example, U.S. Pat. No. 5,920,023, issued Jul. 6, 1999 to Steven R. Ravagni et al. for "Stringed Instrument Finger Positioning Guide and Method for Teaching Students to Read Music," discloses a device for teaching students of stringed instruments note locations and proper finger placement on the fingerboard of the instrument. The device may be adapted for use with either a fretted or non-fretted instrument. The device comprises a sheet of autogenuously adhesive plastic, such as cling vinyl, on which is printed a series of markers indicating note locations, scales, or chords. If the device is to be applied to a fretted instrument, the device further has fret openings cut therein, adapted to engage the frets when applied to the instrument. The device is applied to the instrument by inserting it between the strings and the fingerboard, wrapping it around the neck of the instrument and adhering it onto itself along the back of the neck of the instrument.

Likewise, U.S. Pat. No. 8,399,756, issued Mar. 19, 2013 to John Trent et al. for "Guitar Strip," discloses a system for aiding in the teaching and playing of stringed instruments, allowing for easily understood, non-descript reference points. The system is a decal or series or decals or other printed thin attachable strips, depicting the notes on a given string corresponding to a given finger position. The decals are placed on the back of the neck near the top of the fretboard, or nut, allowing the player a clear view of the notes from a natural playing position, rather than having to look at the front of the fingerboard as in other systems.

Similarly, U.S. Pat. No. 8,704,066, issued Apr. 22, 2014 to David C. Jacobsen for "Removable Fretboard Stickers with Musical Indicia," discloses a device and method for teaching note locations, fretboard patterns, scales, and chords on the fingerboard of a fretted stringed instrument, such as an electric or acoustic guitar. The invention comprises a set of independently affixable fretboard adhesive labels (i.e., stickers) that adhere to the surface of the stringed instrument, using a mild adhesive so as not to damage the instrument, and a number of markings, which indicate musical indicia. The device is applied to the instrument by slipping various individual stickers between the corresponding frets and strings of the stringed instrument and affixing the stickers directly to the fretboard.

The above Ravagni, Trent, and Jacobsen systems are cumbersome to apply and alter the integrity of the fretboard by adding an extra layer of material. The student is thus reinforced with an incorrect feeling of playing the instrument and must account for this altered muscle memory when later playing the guitar without the layer of adhesive plastic. Further, because the Ravagni vinyl is pre-printed with the series of markers, the student does not have the ability to alter the markers as he progresses through learning certain chords and notes. In contrast, the present invention does not compromise the integrity of the fretboard or the student's physical perception of the correct method of playing the instrument by providing a surface that is incorporated into the surface of the instrument. The present invention further improves upon the Ravagni and Trent systems by offering an alternative that allows the student to alter the markers as he so desires, and allowing the markers to be placed on any area of the fretboard as to facilitate the best learning experience for the particular student.

A third option present in the art is to have a series of cards which can be alternately placed on the fretboard of the guitar and then withdrawn after the fingers are placed in the proper positions. For example, U.S. Pat. No. 3,153,970 issued Oct. 27, 1964 to Royce L. Mulchi for "Aid for Stringed Instruments," and discloses a series of cards, each of a size such that it can be placed on the keyboard beneath the strings and above the frets. Each card has marked thereon a series of longitudinal lines and transverse lines corresponding respectively with the portions of the strings and frets of the guitar. The card may be inserted under the strings of the guitar to rest upon the frets with one edge abutting the nut. The card is adjusted laterally to bring the longitudinal markings into coincidence with strings. When the card has the edge against the nut, the transverse lines are directly above the frets of the instrument. The card is marked to indicate the desired position of the finger with respect to the lines on the card to correspond with the correct position of the fingers on the strings in relation to the frets. The student can then place the fingers on the strings in the indicated positions on the card below the strings. Then by withdrawing the card while the fingers remain on the strings, the latter will be pressed into engagement with the adjacent frets so that the desired notes will be sounded when the strings are vibrated. The invention contemplates a series of cards, each marked to indicate the correct finger positions for a certain chord.

The Mulchi invention requires students to continually stop instrument play to remove from the fretboard the cards that were previously placed on the instrument. This drawback alone is sufficient to make these devices virtually worthless to students trying to learn long musical phrases and complex fretboard patterns. The present invention improves upon this disruptive method by allowing the student to mark finger positions directly on the fretboard surface, thereby eliminating the need to continually place cards into position and remove as needed while learning the fretboard patterns.

U.S. Pat. No. 6,218,603, issued Apr. 17, 2001 to Phillip R. Coonce, discloses an apparatus and method for a note locator of stringed instruments. The application of acoustic laws allows calculation of the location for note position indicators upon the note locator. These locations are presented in a visual format. The note locator comprises a flexible planar top and bottom surface wherein the top surface has note position indicators of color and the bottom surface has an adhesive so that it can be placed beneath the strings of the instrument along the fingerboard without interfering with the normal operation of the instrument. Fingerboard alignment indicators aid in correct placement of the note locator. The user learns correct finger placement for playing the instrument by visually identifying colors with the notes of the equitempered chromatic scale. Diatonic scale note position indicators are indicated with various distinct colors, while other half step note position indicators are indicated with a color different from that of the diatonic scale note position indicators. The Coonce method and apparatus is strictly limited to a color-coding based presentation, which may not be the best learning device for all students. Further, the present invention improves upon the Coonce method by offering maximum flexibility in the application of the markings to the fretboard, whereas the Coonce method is rigid in its application and use.

U.S. Pat. No. 8,841,531, issued Sep. 23, 2014 to Charles E. Squillante for "Sheet Music Holder and Method for Playing an Instrument," discloses a sheet music holder for a drum kit suitable to provide sheet music to a drumhead so that the music may be read when the drum is played. The sheet music holder preserves the condition of the sheet music and is suitable to dampen the sound of the drum it is placed on. While the Squillante method may be directly applied to the instrument, it is not adaptable for use on a fretboard. It further does not offer the option of the student directly marking the note positions onto the instrument, which would reinforce the memory of the student and would provide for a more effective learning technique.

Lastly, U.S. Pat. No. 5,373,768, issued Dec. 20, 2014 to Kevin Sciortino for a "Musical Instrument Neck Illuminator," discloses an attachable and removable illuminated fiber optic strand adhered to the top side surface of a guitar neck and which conducts light to a plurality of predetermined proportionally etched abrasions exposed along the longitudinal length of the optically conductive fiber optic strand. The device provides multiple illuminated points of light along the top side surface of the guitar neck facing the guitarist, thereby allowing the instrument to be played in the dark and producing a pleasing visual effect. While the Sciortino guitar allows for visible lights to be activated along a guitar neck, it does not provide the solution of the present invention, which allows for students to selectively mark the fingerboard or fretboard of an instrument to learn the correct placement of chord positions. Sciortino instead provides for light-enabled markings after the user has already placed his or her fingers on the fretboard of the guitar, which may reinforce the position of the chords as the instrument is being played, but does not act as a training device wherein the user would choose where to mark the finger positions of the appropriate chord prior to playing the instrument itself.

It is therefore an object of the present invention to provide an improved method of learning how to play a stringed instrument, by providing a method for marking visual cues directly on the surface of a fretboard or fingerboard of the instrument.

It is a further object of the present invention to provide for a temporary application of such visual cues to the surface of the fretboard or fingerboard, so that a student may maximize the positions learned when playing music on the instrument.

It is a further object of the present invention to allow for maximum flexibility in the application of the markings, so that a student may most effectively learn the correct finger positions in playing music on the fretboard or fingerboard.

It is a further object of the present invention to provide a method wherein the visual cues may be temporarily applied to the fretboard or fingerboard without the use of a cumbersome piece of material that may hinder efficient learning of the fretboard.

It is a further object of the present invention to provide a method of learning how to play an instrument wherein the visual cues may be applied to the fretboard or fingerboard without the use of an adhesive plastic or multiple pieces of adhesive material that would compromise the student's natural, correct feel of playing the instrument.

It is a further object of the present invention to provide a method wherein the visual cues may remain present on the surface of the fretboard or fingerboard for as long as the student requires, such that the student is not required to continually replace one or more of a series of cards, each marked to indicate the correct finger positions of a certain chord, when moving onto the process of learning the next appropriate chord.

It is a further object of the present invention to provide a method wherein the user is in complete control of the location of the visual cues on the fretboard or fingerboard, allowing the user to selectively mark the playing surface of the instrument without being dictated by constraints of the instrument.

SUMMARY OF THE INVENTION

The present invention provides a method and apparatus that achieves the above objectives by incorporating a markable, erasable surface onto the musical instrument. The student may use a writing utensil, such as an erasable marker, to draw the correct finger positions directly on the appropriate spots of the fretboard. Because the surface is also erasable, the student may alter the markings as desired throughout the process of learning how to play the instrument and the appropriate chord positions. The application of the markings directly onto the surface of the fretboard provides two key learning techniques for the student: first, to reinforce the appropriate positions through the act of drawing the positions onto the fretboard; and second, to provide an improved reference point (on the fretboard or fingerboard itself) of the correct finger positions for the student as he is playing the instrument.

BRIEF DESCRIPTION OF DRAWINGS

Reference will now be made to the drawings, wherein like parts are designated by like numerals, and wherein:

FIG. 8 is a perspective view of the present invention in use on a violin, per the disclosure of the present invention.

DETAILED DESCRIPTION OF THE INVENTION

Figure 1:
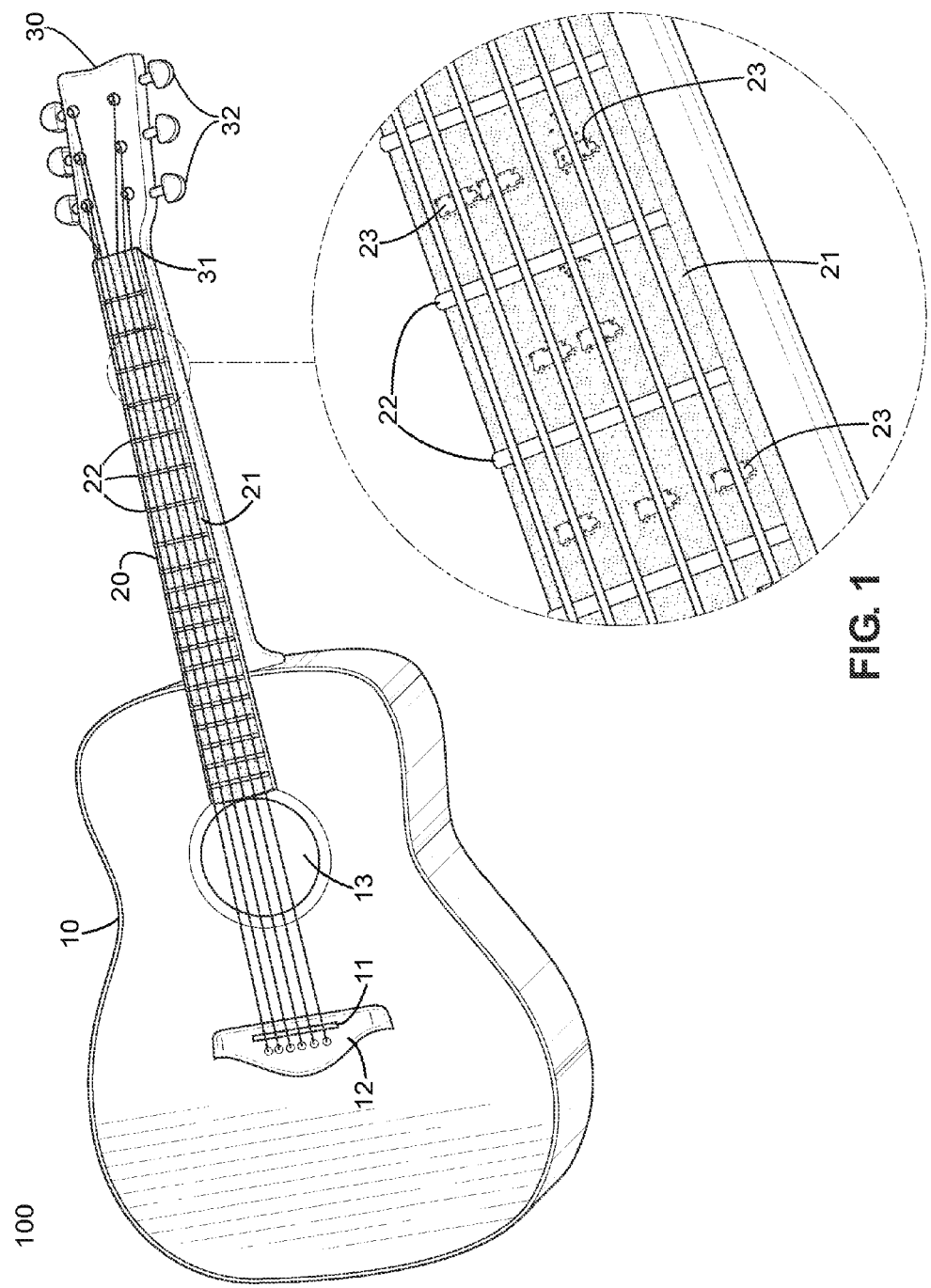
FIG. 1 is a perspective view of the present invention, featuring the removable markings on the surface of the fretboard, per the disclosure of the present invention.

Referring to FIGS. 1-8 generally, the figures depict a perspective view of the markable stringed instrument 100 of the present invention. The markable guitar 100 generally features three separate sections: the body 10; the neck 20; and the headstock 30. The body 10 will typically include saddle 11, bridge 12, and sound hole 13. The neck 20 includes a fretboard (in the present invention, markable fretboard 21) and individual frets 22. Lastly, the headstock 30 typically includes nut 31 and tuners 32.

The markable guitar 100 of the present invention features markable fretboard 21. The surface of fretboard 21 itself is markable and erasable. This markable, erasable surface of fretboard 21 may be, in a preferred embodiment, constructed of chalkboard material. In an alternative embodiment, the markable, erasable surface of fretboard 21 may be constructed of whiteboard material, or may be constructed of a vinyl material. The surface of fretboard 21 is not limited to any one particular construction, but may feature any surface that is markable and erasable. It may further be understood that "erasable" means, in the context of the present invention, any surface that would allow for markings to be selectively removed from the fretboard or fingerboard of the instrument at the will of the user, such as vinyl, an electronically-controlled fretboard or fingerboard, or the more traditional chalkboard.

Due to the markable, erasable surface of fretboard 21 of the present invention, the fretboard 21 may display markings 23. Markings 23 may be applied by any erasable writing instrument that would be compatible with the markable, erasable surface of the fretboard 21, such as chalk (in the case of a chalkboard fretboard), dry erase marker (in the case of a whiteboard fretboard), or permanent marker (in the case of a vinyl fretboard). Markings 23 may be applied at any spot on the fretboard 21, and may generally correspond to correct finger positions for the appropriate chords the student is attempting to learn.

Figure 2:
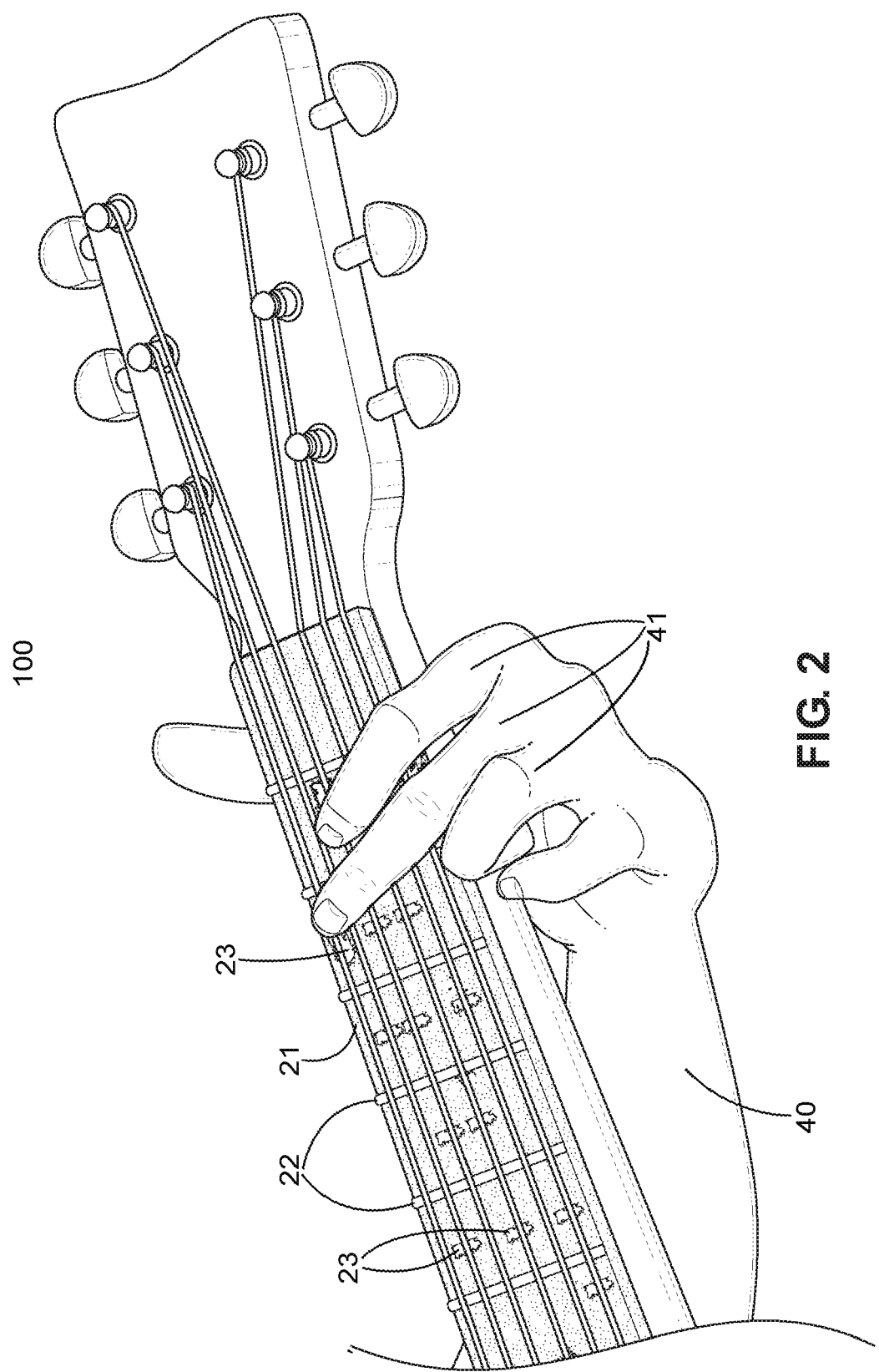
FIG. 2 is a perspective view of the present invention, featuring the fretboard in use by the student, per the disclosure of the present invention.

As depicted in FIG. 2, student 40 may use these markings 23 to correctly orient the appropriate placement of fingers 41 on the fretboard 21. FIGS. 1 and 2 depict multiple markings 23 present on the fretboard 21, but the student 40 may choose to place only a few markings 23 on the fretboard 21 at a time, to more effectively learn the correct finger positions corresponding to certain musical chords. Because of the markable, erasable surface of fretboard 21 of the present invention, any number of markings 23 may be made in any place on the surface of fretboard 21.

Figure 3:
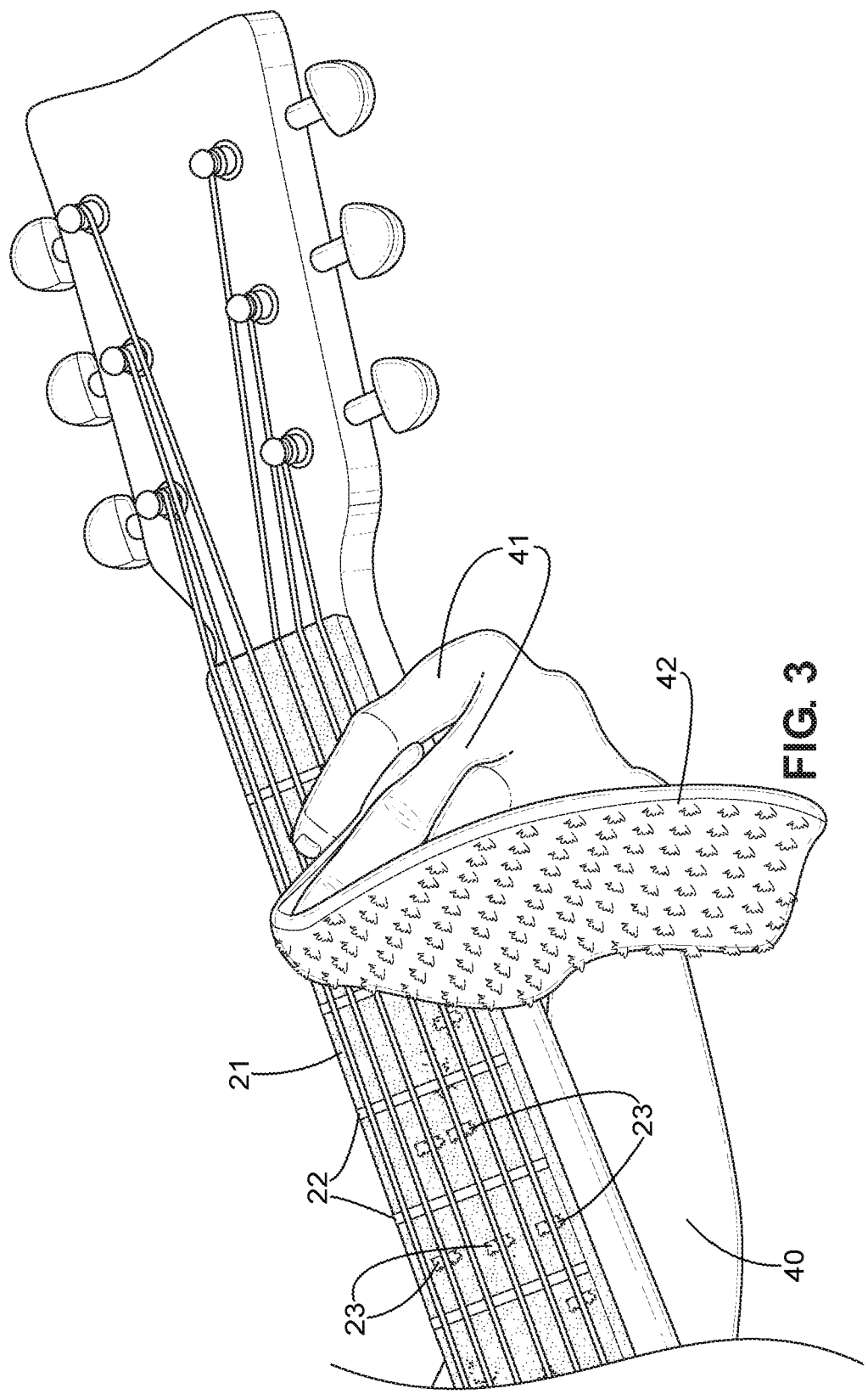
FIG. 3 is a perspective view of the present invention, featuring the student removing the markings from the surface of the fretboard, per the disclosure of the present invention.

As depicted in FIG. 3, markings 23 may be removed from the markable, erasable surface of fretboard 21 as the student so desires. Markings 23 may be removed from the markable, erasable surface of fretboard 21 by use of a rag 42, but may also be removed via any appropriate means, such as an eraser or paper towel.

It may be appreciated from the foregoing that the incorporation of a markable, erasable surface into fretboard 21 of guitar 100 allows for an improved method of learning how to play the guitar. By use of such markings 23 directly on the fretboard 21 of guitar 100, the student 40 is better able to place his fingers 41 on the appropriate spot of guitar 100, and may more accurately visualize the correct finger positions corresponding to certain chords.

Figure 4:
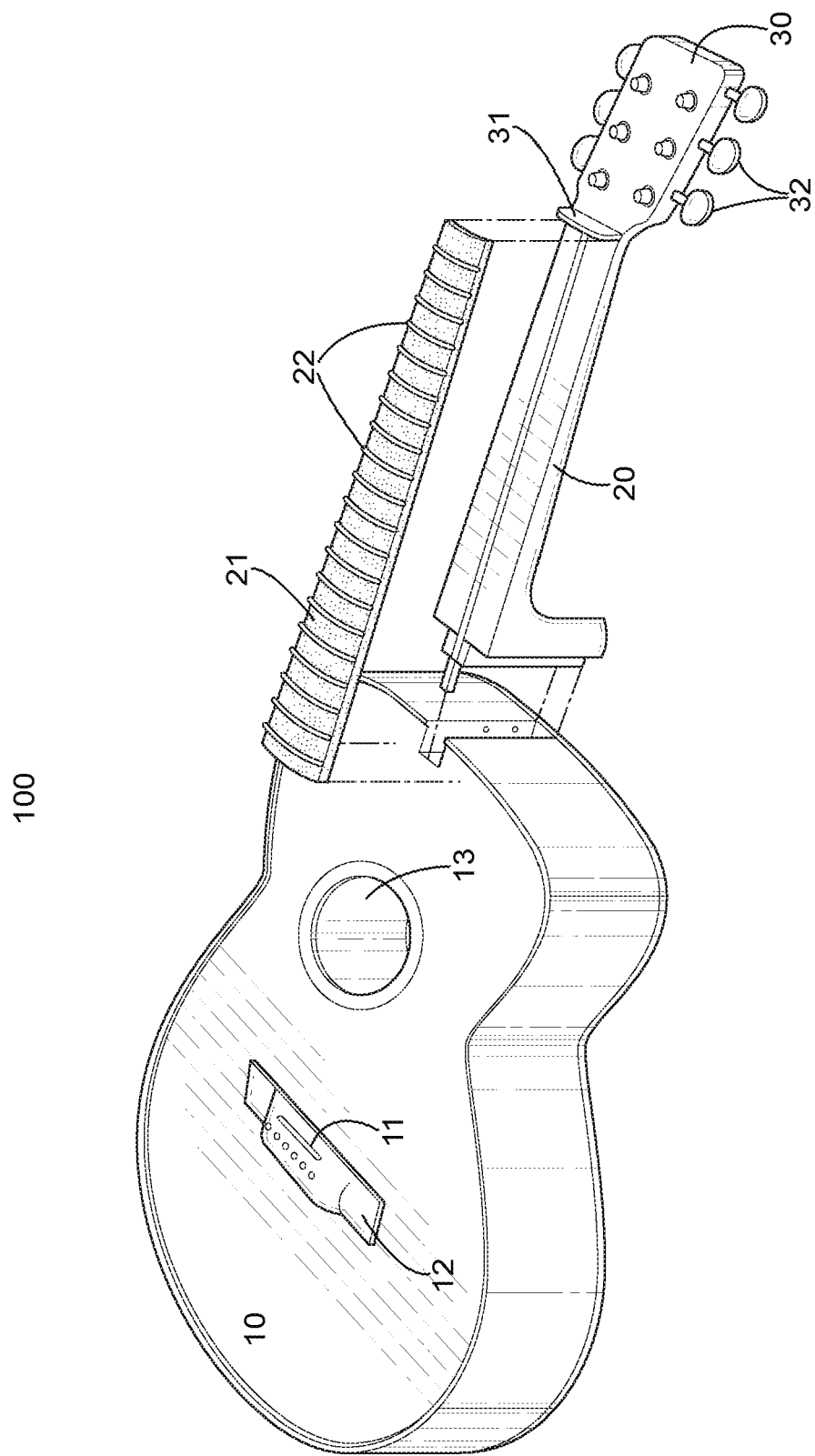
FIG. 4 is an exploded view of the present invention, displaying the portion of the fretboard that is comprised of a markable, erasable surface, per the disclosure of the present invention.

As shown in FIG. 4, the markable, erasable surface of fretboard 21 may be a separate construction that is built directly into the guitar 100. However, the markable, erasable surface of fretboard 21 may alternatively be created by other means, such as use of chalkboard paint. It is understood in the art that use of such chalkboard paint will convert almost any surface into a chalkboard. Application of such chalkboard paint to a fretboard 21 of guitar 100 would allow for removable markings 23 to be applied to the fretboard 21. The manner of creation of the markable, erasable surface of fretboard 21 is not meant to be limited by the described embodiments, but may be achieved by any manner known in the art.

Figure 5:
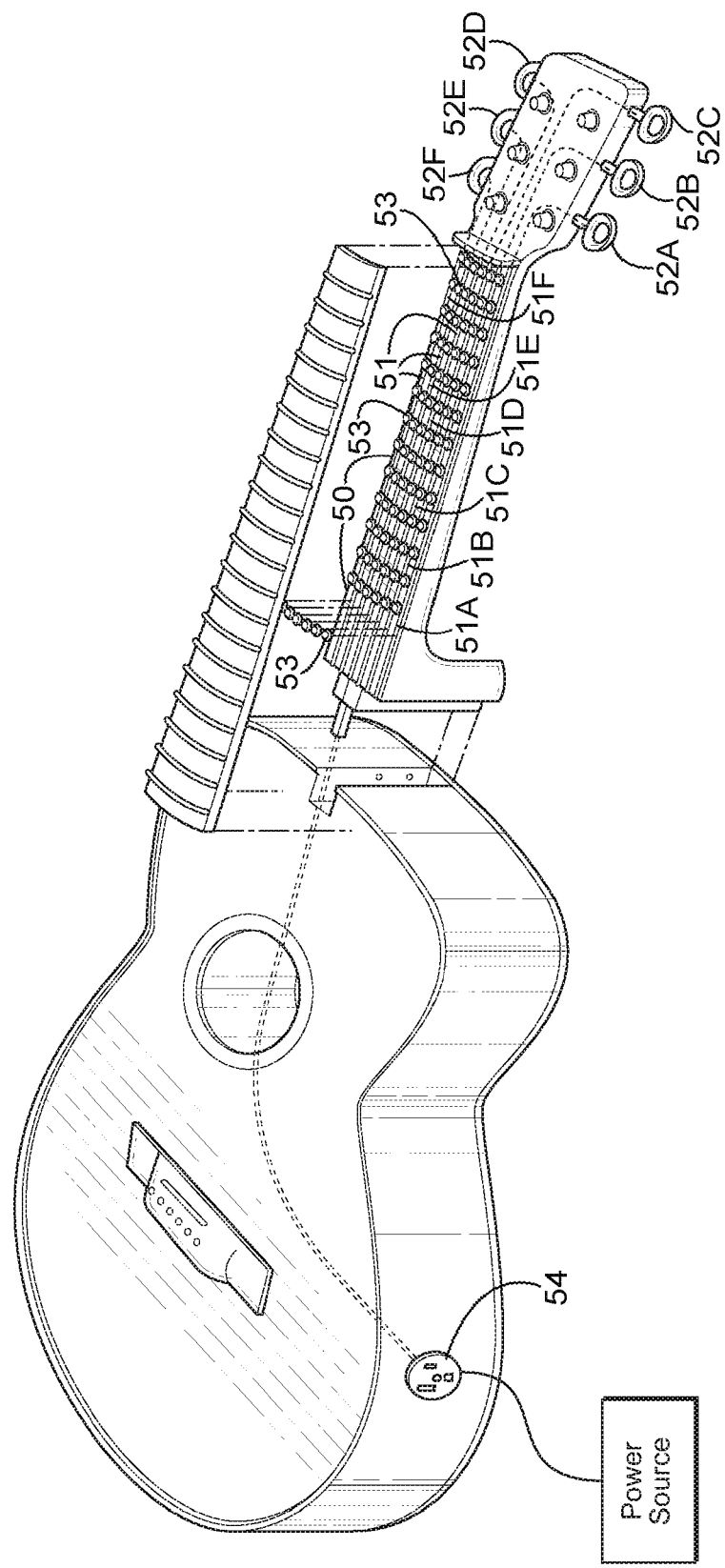
FIG. 5 is an exploded view of an alternative embodiment of the present invention, displaying the wiring components of the fretboard, per the disclosure of the present invention.
Figure 6:
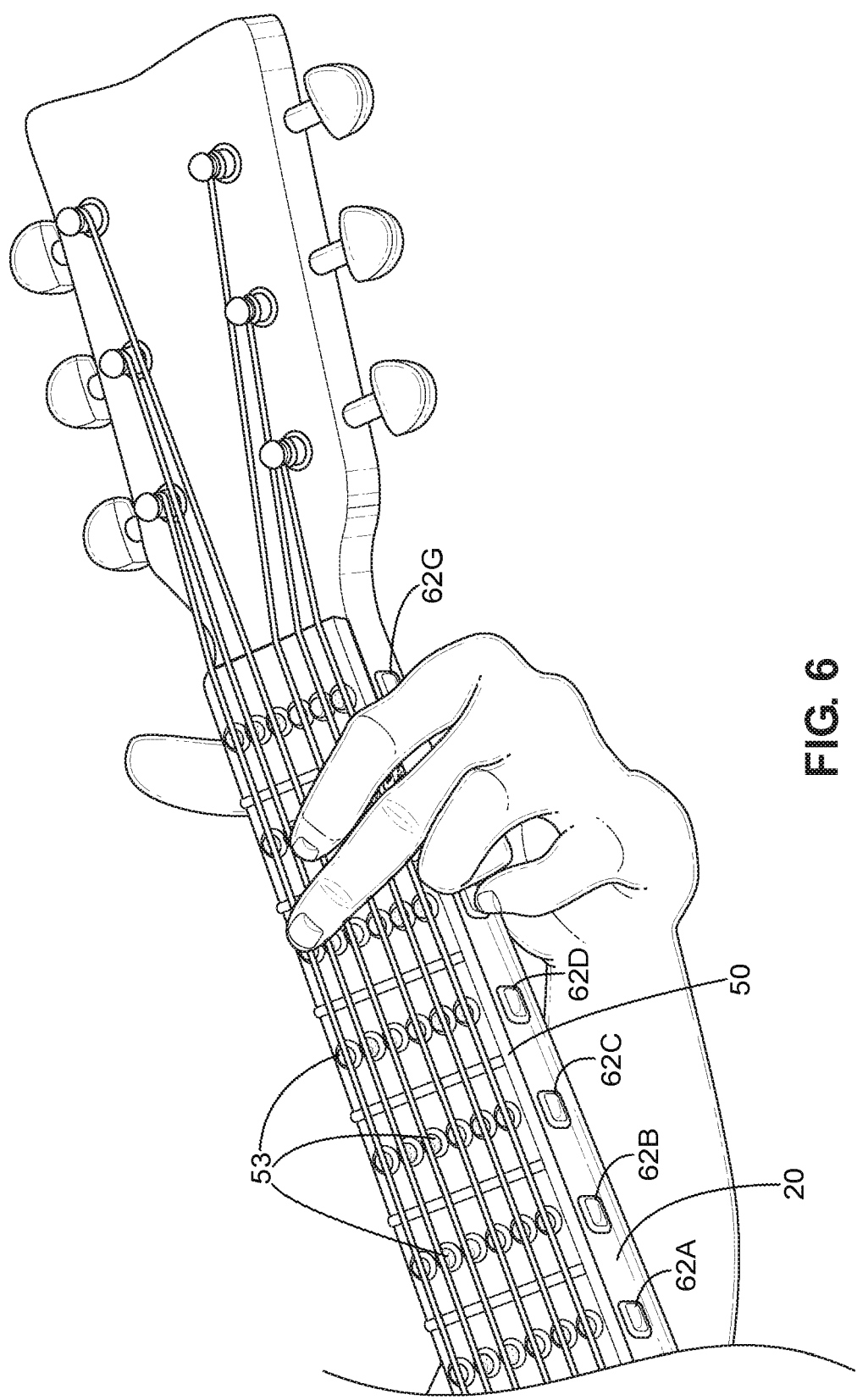
FIG. 6 is a perspective view of the alternative embodiment of the present invention, displaying the wired, power-controlled fretboard in use, per the disclosure of the present invention.

For example, referring now to FIGS. 5 and 6, an alternate, electrical embodiment of the markable guitar 100 is depicted. As shown in FIG. 5, the markable guitar 10 may include a set of wiring 50 that is overlaid on the neck 20 of the instrument, beneath the fretboard 21. This wiring overlay 50 provides an alternate manner of "marking" the markable guitar 100, and may be powered by any traditional power means, such an electrical plug and power source 54. Featured on the wiring overlay 50 is a series of lights 53, which are placed on the wiring overlay 50 in a manner that would allow for a light to be activated on any particular location of the markable fretboard 21.

For example, as depicted in FIG. 5, the wiring overlay 50 has an X- and Y-axis relative to the neck 20 of the instrument, where the X-axis is generally defined by the location of the strings along the neck 20 of the instrument, and the Y-axis is generally defined by the location of the spaces between individual frets 22 along the neck 20 of the instrument. The series of lights 53 may be laid across the wiring overlay 50 such that there is a light corresponding to each intersection of the X-and Y-axes. For example, as shown in FIG. 5, there may be a light 53 located at the spot wherein the first string of the guitar crosses between the first and second fret markers 22, and another light 53 next to the first, placed at the spot wherein the second string of the guitar crosses between the first and second fret markers 22. Similarly, there would be an additional light 53 placed at the spot wherein the first string of the guitar crosses between the second and third fret markers 22. It may be understood by those in the art that such an arrangement of lights 53 across the wiring overlay 50 would allow for a light to be present at each location that the user would choose to place a marking 23 on the markable fretboard 21, as in the embodiments shown in FIGS. 1-4.

Referring in more detail to FIG. 5, the wiring overlay 50 features electrical wirings 51, which are in turn each connected to a wiring control 52. For example, as shown in FIG. 5, electrical wiring 51A is operatively connected to tuner 52A, electrical wiring 51B is operatively connected to tuner 52B, and so forth. It is to be understood by those in the art that each of the electrical wirings 51A, 51B, 51C, 51D, 51E, and 51F on neck 20 of the guitar 100 generally correlate to the position of the strings located on fretboard 21 of the guitar, and comprise the X-axis of neck 20 referred to above.

Each wiring control 52 is featured on the six tuners 32. For example, tuner 32A has a corresponding wiring control 52A, tuner 32B has a corresponding wiring control 32B, and so forth. In a preferred embodiment, wiring controls 52 are buttons, which the user may press to control activation of the wiring overlay 50. Specifically, because the wiring controls 52 are operatively connected to their corresponding electrical wirings 51, upon which the series of lights 53 is featured, activation of the wiring control will effectively activate the series of lights 53. In use, the user would activate a chosen light 53 by first selecting the wiring control or button 52 that corresponds to the correct X-axis of the preferred light 53. For example, should the user wish to activate, or "turn on" a light in a position along the first, or bottom-most string of the guitar, the user would press button 52A, which is operatively connected to electrical wiring 51A, as discussed above. Should the user wish to activate a light in a position along the sixth, or top-most string of the guitar, the user would press button 52F, which controls the lights featured along electrical wiring 51F. It may be understood by those in the art that placement of the wiring controls 52 in this location is an intuitive location, as tuners 32 each correspond to a specific string of the guitar. Accordingly, the wiring control or button 52 is located in a manner that the user would assume correlates to the position of a particular string of the guitar.

Because wiring controls 52A, 52B, 52C, 52D, 52E, and 52F are each in control of one particular electrical wiring, or "X-axis" set of lights, the wiring controls 52A, 52B, 52C, 52D, 52E, and 52F are each further manipulated when the user wishes to activate a different light relative to the Y-axis of the neck 20 of the guitar 100. As shown in FIG. 5 and discussed briefly above, the lights 53 are set out on neck 20 of the guitar 100 along the Y-axis in a manner that generally corresponds to the locations of the individual frets 22 of the guitar 100. The wiring overlay may be configured in a manner such that continual activation of the wiring control will cause the lights along the Y-axis to activate in succession. For example, in use, if the user wishes to activate a light further along this Y-axis of neck 20 of the guitar, the user would press the wiring control 52 of the appropriate X-axis/electrical wiring 51 to activate the light located at the first Y-axis location, which would be, for example, immediately adjacent the first fret location of the neck 20 of the guitar. The user would then press the wiring control 52 of that same appropriate X-axis/electrical wiring 51 to activate the light located at the next, second location, which would be, for example, between the first and second fret markers on the neck 20 of the guitar. The user would continue to press the wiring control 52 in such a manner until the desired light placed at the appropriate Y-axis/fret marker is activated.

It may be appreciated that such a wired overlay 50 with the appropriate layout of lights 53, controlled by wiring controls 52A, 52B, 52C, 52D, 52E, and 52F, allows for the user to activate a light 53 in any desired position on the neck 20 of the guitar 100. The fretboard 21, overlaid on the neck 20 of the guitar 100, as shown in FIG. 5, may be comprised of any semi-transparent material that would allow the lights 53 to display on the fretboard 21 when activated.

The wired overlay 50 may be arranged in any manner that would allow the user to activate the series of lights 53 on the neck 20 of the guitar 100, and is not meant to be limited to the preferred embodiment depicted in FIG. 5. For example, an alternate embodiment of the electrically markable guitar 100 is depicted in FIG. 6. In the embodiment shown in FIG. 6, for example, the wiring controls 62 discussed above are featured along the neck 20 of the guitar 100, rather than being featured on the tuners 52 of the guitar 100. In this FIG. 6 embodiment, the lights 53 and wired overlay 50 are arranged in much the same manner as those discussed above and depicted in FIG. 5, but instead of the wiring controls 52 corresponding to a particular set of lights 53 along the X-axis, the wiring controls 62 correspond to the set of lights 53 along the Y-axis. In a preferred embodiment, as shown in FIG. 6, there are seven Y-axis lines of lights 53, placed generally outside and between the fret markers 22 of the markable guitar 100. Accordingly, the markable guitar 100 would feature seven corresponding wiring controls or buttons 62A, 62B, 62C, 62D, 62E, 62F, and 62G. In use, similar to the embodiment discussed above in relation to FIG. 5, the user would press or activate the selected wiring control 62 corresponding to the Y-axis of the desired light 53. For example, as depicted in FIG. 6, if the user wished to activate a light featured between the second and third fret markers 22 of the markable guitar 100, the user would press or activate wiring control 62D.

Because wiring controls 62A, 62B, 62C, 62D, 62E, 62F, and 62G are each in control of one particular electrical wiring on the Y-axis of the set of lights, the wiring controls 62A, 62B, 62C, 62D, 62E, 62F, and 62G are each further manipulated when the user wishes to activate a different light relative to the X-axis of the neck 20 of the guitar 100. For example, as shown in FIG. 6 and discussed above, the lights 53 are set out on the neck 20 of the guitar 100 along the X-axis in a manner that generally corresponds to the locations of the individual strings of the guitar 100. The wiring overlay may be configured in a manner such that continual activation of the wiring control 62 will cause the lights along the X-axis to activate in succession. For example, in use, if the user wishes to activate a light further along this X-axis of neck 20 of the guitar, the user would press the wiring control 62 of the appropriate Y-axis/electrical wiring to activate the light located at the first X-axis location, which would be, for example, underneath the first or bottom-most string of the guitar 100. The user would then press the wiring control 62 of that same appropriate Y-axis/electrical wiring to activate the light located at the next, second location, which would be, for example, underneath the second string of the guitar 100. The user would continue to press the appropriate wiring control 62 in such a manner until the desired light placed at the appropriate X-axis/guitar string is activated.

It may be appreciated that such a wired overlay 50 with the appropriate layout of lights 53, controlled by wiring controls 62A, 62B, 62C, 62D, 62E, 62F, and 62G, allows for the user to activate a light 53 in any desired position on the neck 20 of the guitar 100. The fretboard 21, overlaid on the neck 20 of the guitar 100, as shown in FIG. 6, may be comprised of any semi-transparent material that would allow the lights 53 to display on the fretboard 21 when activated. Alternatively, the series of lights 53 may be present on top of the fretboard 21, such that there is no additional layer necessary on top of the neck 20 of the markable guitar 100. In a preferred embodiment, such the height of such lights 53 would be flush with the fretboard 21 of the markable guitar 100, such that the light 53 do not extend beyond the fretboard 21 in a manner that would disrupt the feel of the instrument 100 when being played by the user.

Figure 7:
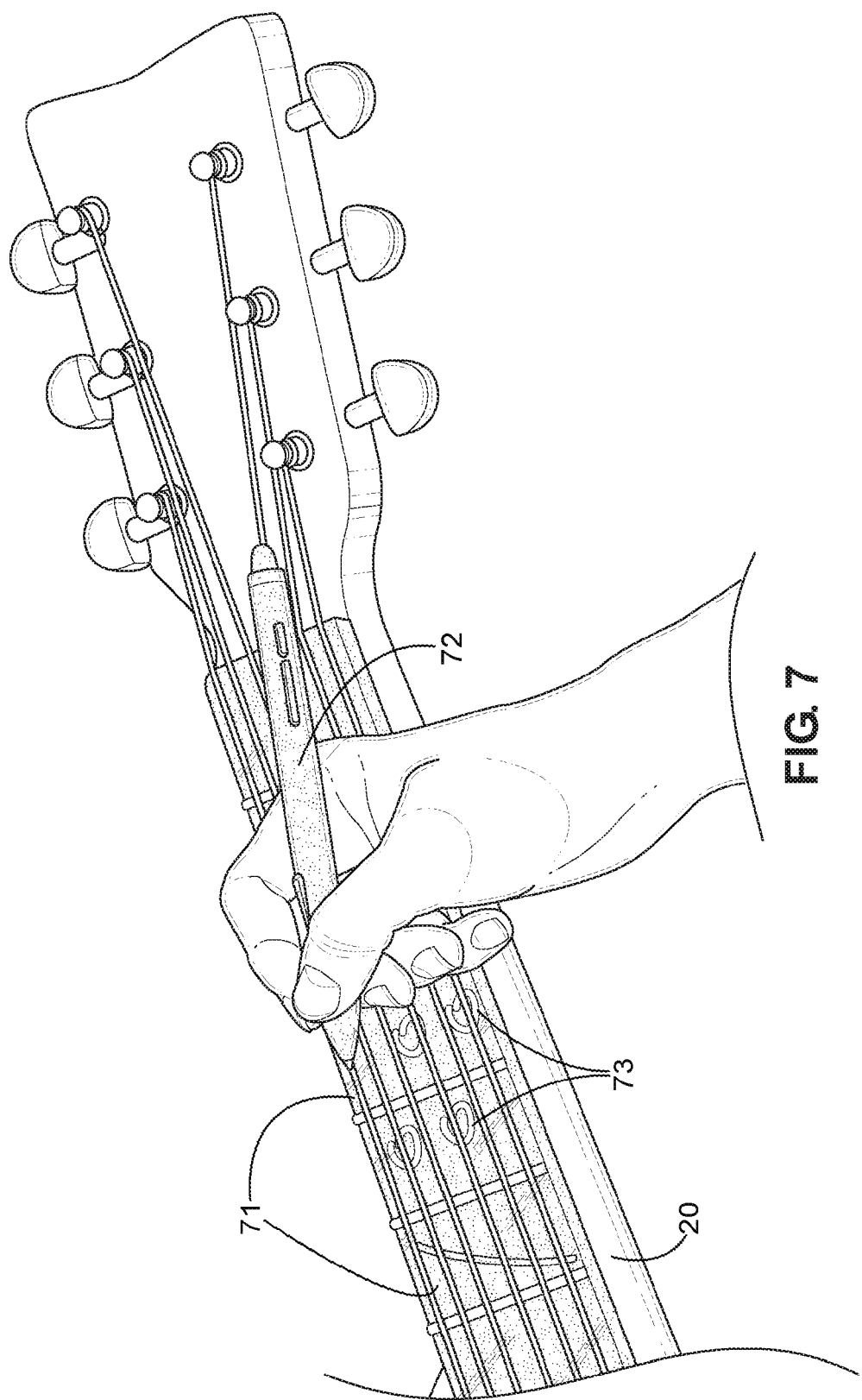
FIG. 7 is a perspective view of an alternative embodiment of the present invention, displaying the stylus-controlled fretboard in use, per the disclosure of the present invention.

Referring now to FIG. 7, an alternate embodiment of the markable guitar 100 is shown, with an additional mode of creating the removable markings 23 on the markable fretboard 21 of the instrument 100. In this alternate embodiment, the markable fretboard 21 is marked with a stylus 72, which is, generally speaking, a small, pen-shaped instrument used to input commands to a screen. It is known in the art that a stylus may be used, for example, to write graphics on the screen of a tablet, smart phone, or computer screen. In the present invention, the neck 20 of the markable instrument 100 is overlaid with a stylus-responsive material to create a stylus-responsive fretboard 71. In use, the user would use stylus 72 to create the markings 23 on the markable fretboard 71 in much the same way as discussed above in relation to the chalkboard or whiteboard markable fretboard depicted in FIGS. 1-4. The stylus-responsive guitar 100 of FIG. 7 would also be equipped with means to "erase" such stylus markings, such as, for example, a button that would delete the inputted data, which has taken the form of digital markings 73, from the stylus-responsive markable fretboard 71. In this way, the user may apply, erase, and re-apply digital markings 73 to the stylus-responsive fretboard 71 in the same manner as applying, erasing, and re-applying physical markings 23 to, for example, a chalkboard markable fretboard 21.

Referring now to FIG. 8, it may be understood that the markable surface of the markable instrument may be a fingerboard 81, rather than a fretboard as discussed above. The present invention is not meant to be limited to stringed instruments featuring a fretboard, such as a guitar, but may be further applied to any stringed instrument with a neck 20 that may be overlaid with or created of a markable material, such as chalkboard, whiteboard, vinyl, an electronically wired system, or a stylus-responsive material, as discussed above. For example and without limitation, the present invention may be applied to a violin, to create a markable violin 80. In use, the user could create markings 23 on the markable fingerboard of the neck 20 of the instrument 80 in the same manner as discussed above in the "fretboard" embodiments depicted in FIGS. 1-7.

Many further changes and modifications can be made in the present invention without departing from the spirit thereof. I therefore pray that my rights to the present invention be limited only by the scope of the appended claims.

I claim:

1. A markable, stringed musical instrument comprising:
   (i) a body;
   (ii) a headstock;
   (iii) a set of strings operatively connected to said headstock; and
   (iv) a neck, wherein said neck has a relative Y-axis and a relative X-axis, said relative X-axis corresponding to said set of strings of said stringed musical instrument, said neck further comprising:
      (a) a markable surface, wherein said markable surface is comprised of a markable material such that a visual indicia may be selectively applied by a user to said markable surface by a surface-compatible marking instrument;

wherein said visual indicia correspond to finger positions on said neck appropriate for playing said musical instrument;

wherein said visual indicia may thereafter be selectively removed from said markable surface with a surface-compatible erasing instrument by said user as desired; and wherein said visual indicia may be selectively re-applied as desired by user to said markable surface by said surface-compatible marking instrument; and wherein, in use, said user may apply said visual indicia to said markable surface of said stringed musical instrument prior to playing said stringed musical instrument, such that said visual indicia indicate to said user the appropriate placement of finger positions on said stringed instrument to play a desired chord or set of notes on said stringed instrument.

2. The markable, stringed musical instrument of claim 1, wherein said markable material of said markable surface is vinyl, and said surface-compatible marking instrument is a permanent marker, such that, in use, said user may apply said visual indicia to said vinyl markable surface with said permanent marker and remove said visual indicia from said vinyl markable surface as desired.

3. The markable, stringed musical instrument of claim 1, wherein said markable material of said markable surface is a stylus-responsive material, and said surface-compatible marking instrument is a stylus instrument, such that, in use, said user may apply said visual indicia to said stylus-responsive markable surface with said stylus and remove said visual indicia from said stylus-responsive markable surface as desired.

4. The markable, stringed musical instrument of claim 1, wherein said markable material of said markable surface comprises a wired overlay, wherein said wired overlay is featured on said neck of said stringed musical instrument; wherein said wired overlay features a set of electronically-operated lights operatively connected to said wired overlay; and wherein said wired overlay is further operatively connected to a series of electrical wirings, each said electrical wiring operatively connected to a corresponding wiring control;

wherein, in use, said wiring control may be manipulated by said user such that a selected light of said set of electronically-operated lights is activated, creating said visual indicia on said markable surface of said markable instrument; and wherein, in use, said wiring control may be further manipulated by said user such that said selected light of said set of electronically-operated lights is deactivated, removing said visual indicia from said markable surface of said markable instrument.

5. The markable, stringed musical instrument of claim 4, wherein said set of electronically-operated lights are featured on said wired overlay in a pattern relative to said X-axis and said Y-axis of said neck of said stringed musical instrument, creating an X-axis of said set of electronically-operated lights and a Y-axis of said set of electronically-operated lights;

wherein said X-axis of said set of electronically-operated lights generally corresponds to said strings of said stringed musical instrument; and wherein said Y-axis of said set of electronically-operated lights is created by equal, parallel spacing of said electronically-operated lights along said Y-axis of said neck of said stringed musical instrument.

6. The markable, stringed musical instrument of claim 5, wherein each said wiring control is a button, wherein, in use, said user may depress said button to activate said wiring control.

7. The markable, stringed musical instrument of claim 6, wherein said headstock comprises a set of knobs and tuners to control said set of strings of said stringed musical instrument, and said buttons are each featured on each said knob on said headstock, and wherein each individual said button controls said X-axis of said set of electronically-operated lights corresponding to the appropriate string of said knob featuring said individual button.

8. The markable, stringed musical instrument of claim 7, wherein, in use, said button activates said electronically-operated lights along said X-axis of said electronically-operated lights in succession until said selected light is activated by said user.

9. The markable, stringed musical instrument of claim 6, wherein said buttons are each featured on said neck of said stringed instrument, in locations created by equal, parallel spacing of said buttons generally corresponding to said Y-axis of said set of electronically-operated lights, and wherein each individual said button controls said Y-axis of said set of electronically-operated lights corresponding to the appropriate location of each said individual button.

10. The markable, stringed musical instrument of claim 9, wherein, in use, said button activates said electronically-operated lights along said Y-axis of said electronically-operated lights in succession until said selected light is activated by said user.

11. A method of creating a markable, stringed musical instrument, comprising:

(i) providing a markable, stringed instrument, said markable, stringed instrument comprising:

(a) a body;

(b) a headstock;

(c) a set of strings operatively connected to said headstock; and (d) a neck, wherein said neck has a relative Y-axis and a relative X-axis, said relative X-axis corresponding to said set of strings of said stringed musical instrument, said neck further comprising:

(1) a markable surface, wherein said markable surface is comprised of a markable material such that a visual indicia may be selectively applied by a user to said markable surface by a surface-compatible marking instrument;

wherein said visual indicia correspond to finger positions on said neck appropriate for playing said musical instrument;

wherein said visual indicia may thereafter be selectively removed from said markable surface with a surface-compatible erasing instrument by said user as desired; and wherein said visual indicia may be selectively re-applied as desired by said user to said markable surface by said surface-compatible marking instrument;

wherein, in use, said user may apply said visual indicia to said markable surface of said stringed musical instrument prior to playing said stringed musical instrument, such that said visual indicia indicate to said user the appropriate placement of finger positions on said stringed instrument to play a desired chord or set of notes on said stringed instrument.

12. The method of creating a markable, stringed instrument of claim 11, wherein said markable material of said markable surface is vinyl, and said surface-compatible marking instrument is a permanent marker, such that, in use, said user may apply said visual indicia to said vinyl markable surface with said permanent marker and remove said visual indicia from said vinyl markable surface as desired.

13. The method of creating a markable, stringed instrument of claim 11, wherein said markable material of said markable surface is a stylus-responsive material, and said surface- compatible marking instrument is a stylus instrument, such that, in use, said user may apply said visual indicia to said stylus-responsive markable surface with said stylus and remove said visual indicia from said stylus-responsive markable surface as desired.

14. The method of creating a markable, stringed instrument of claim 11, wherein said markable material of said markable surface comprises a wired overlay, wherein said wired overlay is featured on said neck of said stringed musical instrument; wherein said wired overlay features a set of electronically-operated lights operatively connected to said wired overlay; and
   wherein said wired overlay is further operatively connected to a series of electrical wirings, each said electrical wiring operatively connected to a corresponding wiring control;
   wherein, in use, said wiring control may be manipulated by said user such that a selected light of said set of electronically-operated lights is activated, creating said visual indicia on said markable surface of said markable instrument; and
   wherein, in use, said wiring control may be further manipulated by said user such that said selected light of said set of electronically-operated lights is deactivated, removing said visual indicia from said markable surface of said markable instrument.

15. The method of creating a markable, stringed musical instrument of claim 14, wherein said set of electronically-operated lights are featured on said wired overlay in a pattern relative to said X-axis and said Y-axis of said neck of said stringed musical instrument, creating an X-axis of said set of electronically-operated lights and a Y-axis of said set of electronically-operated lights;
   wherein said X-axis of said set of electronically-operated lights generally corresponds to said strings of said stringed musical instrument; and
   wherein said Y-axis of said set of electronically-operated lights is created by equal, parallel spacing of said electronically-operated lights along said Y-axis of said neck of said stringed musical instrument.

16. The method of creating a markable, stringed musical instrument of claim 15, wherein each said wiring control is a button, wherein, in use, said user may depress said button to activate said wiring control.

17. The method of creating a markable, stringed musical instrument of claim 16, wherein said headstock comprises a set of knobs and tuners to control said set of strings of said stringed musical instrument, and said buttons are each featured on each said knob on said headstock, and wherein each individual said button controls said X-axis of said set of electronically-operated lights corresponding to the appropriate string of said knob featuring said individual button.

18. The method of creating a markable, stringed musical instrument of claim 16, wherein, in use, said button activates said electronically-operated lights along said X-axis of said electronically-operated lights in succession until said selected light is activated by said user.

19. The method of creating a markable, stringed musical instrument of claim 16, wherein said buttons are each featured on said neck of said stringed instrument, in locations created by equal, parallel spacing of said buttons generally corresponding to said Y-axis of said set of electronically-operated lights, and wherein each individual said button control said Y-axis of said set of electronically-operated lights corresponding to the appropriate location of each said individual button.

20. The method of creating a markable, stringed musical instrument of claim 19, wherein, in use, said button activates said electronically-operated lights along said Y-axis of said electronically-operated lights in succession until said selected light is activated by said user.

\* \* \* \* \*